United States Patent [19]
Kassmann

[11] Patent Number: 6,040,791
[45] Date of Patent: Mar. 21, 2000

[54] SYSTEM AND METHOD FOR GREY VALUE EXPANSION OF PIXEL DATA

[75] Inventor: Gary W. Kassmann, Rochester, N.Y.

[73] Assignee: Xerox Corporation, Stamford, Conn.

[21] Appl. No.: 08/340,785

[22] Filed: Nov. 17, 1994

[51] Int. Cl.[7] .................................................. G06K 9/00
[52] U.S. Cl. ........................................................ 341/95
[58] Field of Search .................................... 382/305, 307, 382/299; 341/95

[56] References Cited

U.S. PATENT DOCUMENTS

| | | | |
|---|---|---|---|
| 4,698,688 | 10/1987 | Ochi et al. | 341/95 |
| 4,985,701 | 1/1991 | Motoe et al. | 341/95 |
| 5,091,660 | 2/1992 | Usami | 341/95 |

Primary Examiner—Christopher S. Kelley
Attorney, Agent, or Firm—Michael J. Nickerson

[57] ABSTRACT

A grey image value expansion method or system enables a receiving system to convert image data having a lower bit resolution to the higher native bit resolution of the receiving system. The conversion or expansion produces a new pixel byte which is a compilation of the received pixel byte wherein the received pixel byte has been repeated at least two times in the compilation. More specifically, a pixel byte having a bit resolution equal to A is converted to a new pixel byte having a bit resolution equal to B wherein the new pixel byte is a compilation of the received pixel byte. The received pixel byte is a unit of the new pixel byte such that the received pixel byte is repeated N times in the compilation wherein N being an integer equal to or greater than two. The number of repeating received pixel byte can be varied so long as N times A is less than or equal to B.

14 Claims, 4 Drawing Sheets

SYSTEM AND METHOD FOR GREY VALUE EXPANSION OF PIXEL DATA

FIELD OF THE PRESENT INVENTION

The present invention is directed to a system and method for expanding the grey value of a byte of pixel image data. More specifically, the present invention is directed to a system and method which expands the grey value a byte of pixel image data to establish an even distribution of the conversion and to maximize the dynamic range of the converted pixel image data.

BACKGROUND OF THE PRESENT INVENTION

Conventionally, when image data is transmitted from one network or system to another, the image data is typically transmitted as bi-tonal image data. Bi-tonal transmission enables a fast and efficient way for transmitting image data between systems. An example of such a transfer of image data between systems is the typical telefax transmission which transmits image data in a bi-tonal manner.

However, the system receiving the image data usually processes image data having a bit resolution which is greater than that which is transmitted; i.e., eight bits per pixel. Thus, to facilitate the processing of the transmitted image, it is necessary to expand the grey value of the bi-tonal image to the native bit resolution of the receiving system. In other words, the bi-tonal image data must be expanded to the bit resolution of a receiving system in order to take full advantage of conventional image processing functions in the receiving system; i.e. image enhancement, contrast adjustment, etc.

Moreover, grey value expansion or conversion is also required for transmitted multi-bit resolution pixel image bytes when the number of bits per pixel byte (bit resolution) of the received image data is less than the native bit resolution of the receiving system.

Resolution of an image is generally set forth as A×B×C wherein A is the number of pixels per inch in a fast scan or electronic scanning direction; B is the number of pixels per inch in the slow scan or mechanical scanning direction; and C is the number of bits per pixel (grey value). In the present application, the term "bit resolution" is utilized to describe the resolution parameter C, the number of bits per pixel. Thus, as defined in the present specification, expanding the grey value of a pixel is the increasing of the bit resolution of the image data by increasing the number of bits defining a pixel.

Conventionally, grey value expansion has been done for bi-tonal image data by directly mapping a bi-tonal zero to all zeros and a bi-tonal one to all ones. For example, as illustrated in Table 1 below, if the bi-tonal pixel value is a logic zero and this byte of image data is to be converted to eight bits, the output of the conventional mapping conversion would be an eight bit pixel byte having all logic zeros. Moreover, if the pixel value was a logic one and this byte of image data is to be converted to eight bits, the conventional direct mapping method would output an eight bit pixel byte containing all logic ones.

TABLE 1

| ORIGINAL PIXEL VALUE | NEW PIXEL VALUE BY DIRECT MAPPING | ORIGINAL PIXEL VALUE | NEW PIXEL VALUE BY DIRECT MAPPING |
| --- | --- | --- | --- |
| 0 | 00000000 | 1 | 11111111 |

If the received image data to be converted/expanded has a bit resolution corresponding to a multi-bit pixel value; i.e. two bits or four bits per pixel byte; conventionally, the multi-bit pixel value is expanded to an eight bit pixel byte grey value by a padding method. More specifically, for the received multi-bit pixel value, the original pixel bits are placed as the most significant bits of the new pixel byte and the least significant bits are padded with zeros. Table 2 below clearly illustrates the conventional padding conversion method wherein the originally received pixel byte is converted to the new pixel byte by zero padding. For example, as shown in Table 2 below, if the original received pixel byte is 10, the new pixel byte utilizing the padding method would be 10000000. Moreover, if the originally received pixel byte is 0111, the new pixel byte from the padding method would be 01110000. This conventional padding method can be realized by a simple multiplication operation (the pixel byte multiplied by 16 or 10000) or load/shift/load register operation.

TABLE 2

| ORIGINAL PIXEL BYTE | NEW PIXEL BYTE | ORIGINAL PIXEL BYTE | NEW PIXEL BYTE |
| --- | --- | --- | --- |
| 00 | 00000000 | 0110 | 01100000 |
| 01 | 01000000 | 0111 | 01110000 |
| 10 | 10000000 | 1000 | 10000000 |
| 11 | 11000000 | 1001 | 10010000 |
| 0000 | 00000000 | 1010 | 10100000 |
| 0001 | 00010000 | 1011 | 10110000 |
| 0010 | 00100000 | 1100 | 11000000 |
| 0011 | 00110000 | 1101 | 11010000 |
| 0100 | 01000000 | 1110 | 11100000 |
| 0101 | 01010000 | 1111 | 11110000 |

A problem with the conventional methods of expanding the grey value bit resolution of a pixel is that the direct mapping method and the padding method result in a reduced dynamic range for the new pixel byte. Subsequently, any image processing operation performed on the new pixel byte will not be optimized. Therefore, the present invention proposes a grey value expansion method or system which easily converts the lower bit resolution pixel byte into a new higher bit resolution pixel byte without significantly reducing the dynamic range of the converted pixel image data.

SUMMARY OF THE PRESENT INVENTION

One aspect of the present invention is a circuit for expanding a byte of pixel image data having a bit resolution of at least two bits. The circuit includes detecting means for detecting a bit resolution of the byte of pixel image data and new pixel generating means for generating a new pixel image data byte having a predetermined bit resolution when the detecting means detects that the bit resolution of the byte of pixel image data is less than the predetermined bit resolution. The new pixel image data byte is a compilation of a unit byte repeated a predetermined number of times in the compilation. The unit byte is equal to the byte of pixel image data.

Another aspect of the present invention is a method for expanding a byte of pixel image data having a bit resolution of at least two bits. The method detects a bit resolution of the byte of pixel image data and generates a new pixel image data byte having a predetermined bit resolution when the bit resolution of the byte of pixel image data is less than the predetermined bit resolution. The new pixel image data byte is a compilation of a unit byte repeated a predetermined number of times in the compilation wherein the unit byte is equal to the byte of pixel image data.

A third aspect of the present invention is a system for processing received image data having a bit resolution of at least two bits wherein the bit resolution is lower than a native bit resolution. The system includes means for separating the received image data into a plurality of bytes of pixel image data, and detecting means for detecting a bit resolution of a byte of pixel image data. The system also includes new pixel generating means for generating a new pixel image data byte having a predetermined bit resolution when said detecting means detects that the bit resolution of the byte of pixel image data is less than the predetermined bit resolution. The new pixel image data byte is a compilation of a unit byte repeated a predetermined number of times in the compilation such that the unit byte is equal to the byte of pixel image data. Image processing means then image processes the new pixel image data byte.

Further objects and advantages of the present invention will become apparent from the following descriptions of the various embodiments and characteristic features of the present invention.

BRIEF DESCRIPTION OF THE DRAWINGS

The following is a brief description of each drawing used to describe the present invention, and thus are being presented for illustrative purposes only and should not be limitative of the scope of the present invention, wherein.

DETAILED DESCRIPTION OF THE PRESENT INVENTION

The following will be a detailed description of the drawings illustrating in the present invention. In this description, as well as in the drawings, like references represent like devices, circuits, or circuit performing equivalent functions.

In describing the present invention, the term "pixel byte" is used in the present specification and claims to define the unit image data value for a single pixel of image data. For example, in a system that outputs 300 spots per inch by 300 spots per inch will produce 90,000 pixel bytes to define a square inch of an image area. Moreover, a pixel byte may be one bit, two bits, four bits, or eight bits in length, and thus, the length of the pixel byte corresponds to the bit resolution of the image data. Thus, in the example above, if the system produces a four level pixel value, the system would produce 180,000 bits of information; however, the number of bytes would remain the same.

Figure 3:
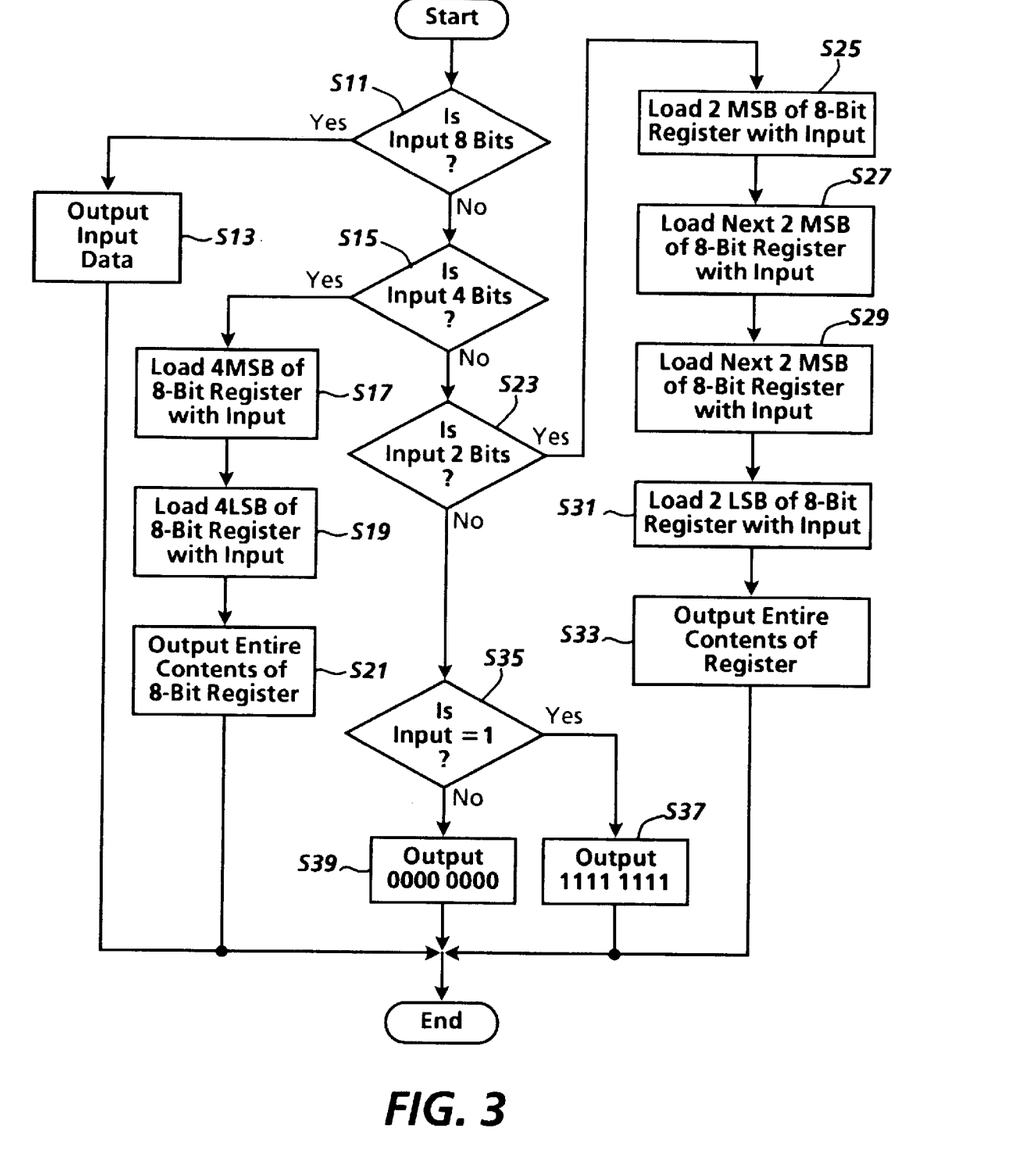
FIG. 3 shows a flowchart illustrating another embodiment of the present invention.

As discussed above, when received image data does not have a bit resolution corresponding to the bit resolution of processing system, the bit resolution of the received pixel byte must be converted to the native bit resolution of the processing system. In most cases, as noted above, the received pixel byte has a bit resolution that is less than the bit resolution native to the receiving processing system; i.e., the received pixel byte is either one bit per pixel, two bits per pixel, or four bits per pixel and the receiving processing system's native bit resolution is eight bits; because the received image data is transmitted at lower bit resolutions due to the efficiencies and lower costs realized by transmitting at low bit resolutions. Thus, the bit resolution conversion is a grey value expansion wherein the received pixel byte is expanded to the bit resolution of the processing system. FIG. 3 illustrates a process, according to the concepts of the present invention, which converts a lower bit resolution pixel byte to the native bit resolution of the receiving processing system.

In the process illustrated by FIG. 3, the received pixel byte is first analyzed at step S11 to determine whether the word length of the pixel byte is eight bits. If the word length of the pixel byte is eight bits, step S13 allows the received pixel byte to bypass the conversion process and be processed directly by the image processing system. However, if step S11 determines that the received pixel byte is not eight bits, the process continues to step S15.

Step S15 determines whether the received pixel byte has a four bit word length. If the received pixel byte has a four bit word length, step S17 loads the four most significant bits (MSB) of an eight bit register with the received four bit pixel byte. Subsequently, step S19 loads the four least significant bits (LSB) of the eight bit register with the received four bit pixel byte. Once the eight bit register is loaded by steps S17 and S19, step S21 outputs the entire contents of the eight bit register as the pixel byte of image data to be processed by the receiving system. The pixel byte in the register after the execution of step S19 is a new pixel byte consisting of a compilation of the received pixel byte, the received pixel byte being a unit in the new pixel byte, which has been repeated two times in the compilation to form an eight bit pixel byte.

It is noted that this process of converting a four bit pixel byte to an eight bit pixel byte can be accomplished with a multiplication operation and an add operation. More specifically, the four bit pixel byte is multiplied as in the conventional zero padding method, and then the four bit pixel byte is added to the product of the multiplication operation to generate a new eight bit pixel byte.

If at step S15, it is determined that the received pixel byte does not have a four bit word length, step S23 determines whether the received pixel byte has a word length of two bits. If step S23 determines that the received pixel byte does not have a word length of two bits, step S35 determines whether the pixel byte is a logic one. If step S35 determines that the received pixel byte is a logic one, step S37 outputs the eight bit word 11111111 as the new pixel byte. On the other hand, if step S35 determines that the received pixel byte is not a logic one, step S39 outputs the eight bit word 00000000 as the new pixel byte.

If step S23 determines that the received pixel byte has a word length of two bits, step S25 loads the two most significant bits of an eight bit register with the two bits of the received pixel byte. Subsequently, step S27 loads the next two most significant bits of the eight bit register with the two bits of the received pixel byte. Then, step S29 loads the next two most significant bits of the eight bit register with the two bits of the received pixel byte. Finally, step S31 loads the two least significant bits of the eight bit register with the two bits of the received pixel byte. After the register is completely loaded with the two bit pixel bytes, step S33 outputs the entire contents of the register as the eight bit image data to be processed by the receiving system. The pixel byte in the register after the execution of step S31 is a new pixel byte consisting of a compilation of the received pixel byte, the received pixel byte being a unit in the new pixel byte, which has been repeated four times in the compilation to form an eight bit pixel byte.

It is noted that this process of converting a two bit pixel byte to an eight bit pixel byte can be accomplished with two multiplication operations and two add operations. More specifically, the two bit pixel byte is multiplied as in the conventional zero padding method, and then the two bit pixel byte is added to the product of the multiplication operation to produce a new four bit pixel byte. This new four bit pixel byte is multiplied as in the conventional zero padding method, and then the new four bit pixel byte is added to the product of the multiplication operation to produce a new eight bit pixel byte.

As described above, steps S17, S19, S25, S27, S29, and S31 provide a process to convert the received pixel byte of a lower bit resolution to a new pixel byte having a bit resolution compatible with the receiving system. In this process, the original bits of the received pixel byte are copied into the most significant bits of the new pixel byte and the copying process is continued with these original bits proceeding towards the least significant bit of the new pixel byte until the entire new pixel byte is filled. On the other hand, an alternative process utilizing the multiplication and add operations described above can be used to realize the bit resolution conversion.

Table 3 below illustrates the values of the new eight bit pixel bytes after the conversion of each received pixel byte. For example, if the received pixel byte has a two bit word length, and a pixel value of 01, the resulting new pixel byte, an eight bit data word, would be 01010101 as shown in Table 3 below. Moreover, if the received pixel byte has a four bit word length, and a pixel value of 0111, the resulting new pixel byte, an eight bit data word, would be 01110111.

TABLE 3

| ORIGINAL PIXEL BYTE | NEW PIXEL BYTE | ORIGINAL PIXEL BYTE | NEW PIXEL BYTE |
| --- | --- | --- | --- |
| 00 | 00000000 | 0110 | 01100110 |
| 01 | 01010101 | 0111 | 01110111 |
| 10 | 10101010 | 1000 | 10001000 |
| 11 | 11111111 | 1001 | 10011001 |
| 0000 | 00000000 | 1010 | 10101010 |
| 0001 | 00010001 | 1011 | 10111011 |
| 0010 | 00100010 | 1100 | 11001100 |
| 0011 | 00110011 | 1101 | 11011101 |
| 0100 | 01000100 | 1110 | 11101110 |
| 0101 | 01010101 | 1111 | 11111111 |

Figure 4:
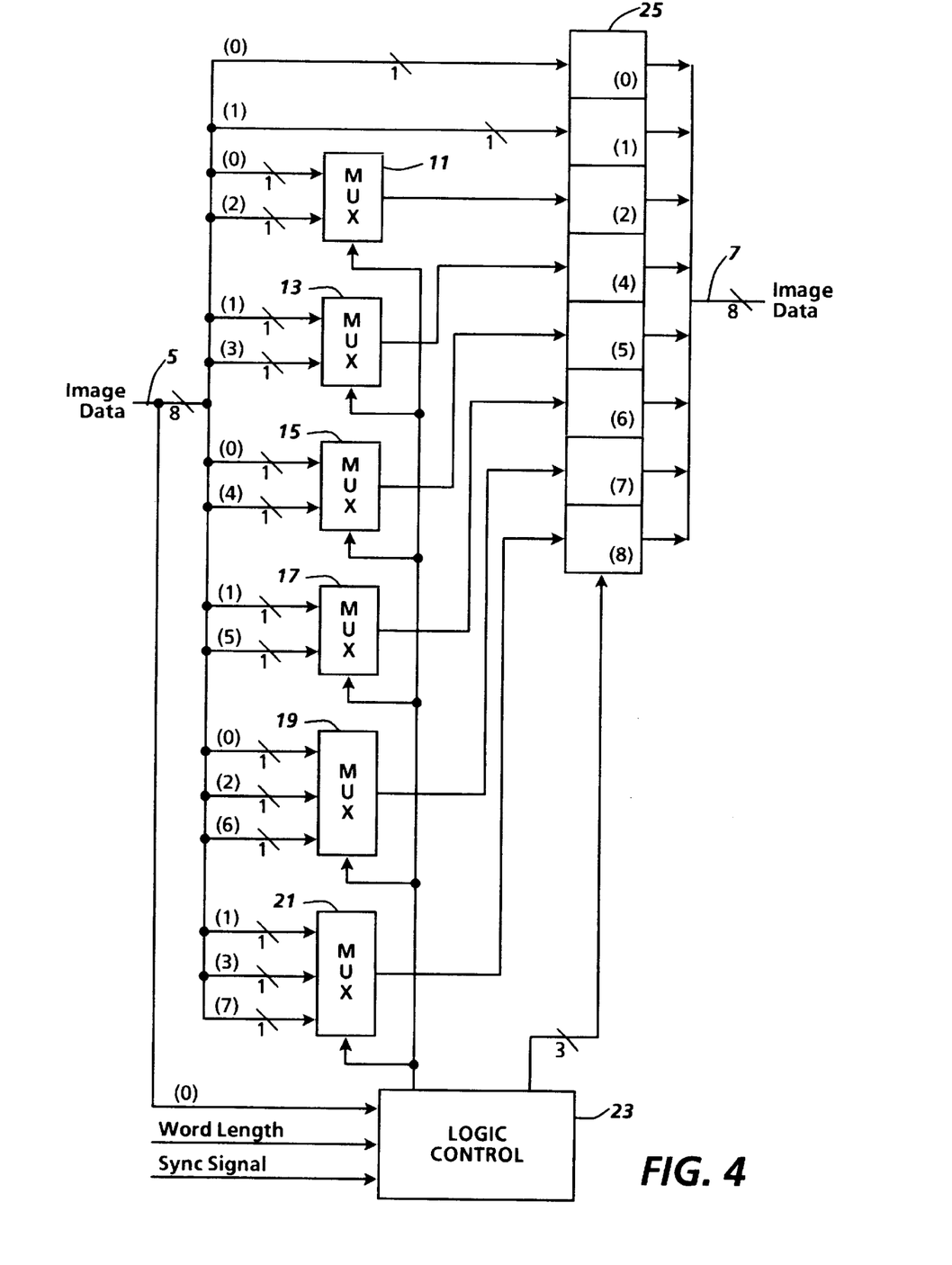
FIG. 4 shows a block diagram illustrating an embodiment of the present invention for carrying out the process of FIG. 3.

FIG. 4 illustrates a circuit that utilizes the register loading process discussed above with respect to FIG. 3. More specifically, as illustrated in FIG. 4, an original pixel byte is received on input bus 5, wherein input bus 5 is an eight bit bus in this example. Connected to input bus 5, is an eight bit register 25 and multiplexers 11, 13, 15, 17, 19, and 21. As illustrated in FIG. 4, the least significant bit (0) of input bus 5 is connected to the least significant bit of the eight bit register 25. Moreover, the next least significant bit of the input bus 5 (1) is also connected directly to the next least significant bit of the eight bit register 25.

Multiplexers 11, 13, 15, 17, 19, and 21 are also connected to register 25 in the following manner. An output of multiplexer 11 is connected to the third bit (2) of the eight bit register 25. An output of multiplexer 13 is connected to the fourth bit (3) of the eight bit register 25. An output of multiplexer 15 is connected to the fifth bit (4) of the eight bit register 25. An output of multiplexer 17 is connected to the sixth bit (5) of the eight bit register 25. An output of multiplexer 19 is connected to the seventh bit (6) of the eight bit register 25. Lastly, an output of multiplexer 21 is connected to the eighth bit (7) of the eight bit register 25.

The multiplexers operate as follows to load the register 25. Multiplexer 11 selects between a first input received from the least significant bit (0) of the input bus 5 and a second input received from the third bit (2) of the input bus 5. Multiplexer 13 selects between a first input received from bit (1) of the input bus 5 and a second input received from bit (3) of the input bus 5. Multiplexer 15 selects between a first input received from the least significant bit (0) of the input bus 5 and a second input received from bit (4) of the input bus 5. Multiplexer 17 selects between a first input received from bit (1) of the input bus 5 and a second input received from bit (5) of the input bus 5. Multiplexer 19 selects between a first input received from the least significant bit (0) of the input bus 5, a second input received from bit (2) of the input bus 5, and a third input received from bit (6) of the input bus 5. Lastly, multiplexer 21 selects between a first input received from bit (1) of the input bus 5, a second input received from bit (3) of the input bus 5, and a third input received from bit (7) of the input bus 5.

A logic control circuit 23 controls the selection of multiplexers 11, 13, 15, 17, 19, and 21 as well as the operations of the eight bit register 25. In other words, the logic control circuit 23 outputs selection signals to each of the multiplexers based on the word length information received by the logic control circuit and outputs control signals to the eight bit register 25 based also on the received word length information and a sync signal received by the logic control circuit.

With respect to the controlling of the multiplexers 11, 13, 15, 17, 19, and 21, if the word length (bit resolution) of the received pixel byte is two bits, the logic control circuit produces a signal such that multiplexers 11, 13, 15, 17, 19, and 21 select the first input (bits (0), (1), (0), (1), (0), and (1), respectively) as the output to the eight bit register 25. The pixel byte generated by the multiplexers is a new pixel byte consisting of a compilation of the received pixel byte, the received pixel byte being a unit in the new pixel byte, which has been repeated four times in the compilation to form an eight bit pixel byte.

On the other hand, if the received pixel byte has a word length (bit resolution) of four bits, the logic control circuit produces a control signal such that multiplexers 15 and 17 select the first input (bits (0) and (1), respectively) and multiplexers 11, 13, 19, and 21 select the second input (bits (2), (3), (2), and (3), respectively) as the output to the eight bit register 25. The pixel byte generated by the multiplexers is a new pixel byte consisting of a compilation of the received pixel byte, the received pixel byte being a unit in the new pixel byte, which has been repeated two times in the compilation to form an eight bit pixel byte.

Lastly, if the word length of the received pixel byte is eight bits, the logic control circuit 23 produces a control signal such that the multiplexers 11, 13, 15, 17 select the second input (bits (2), (3), (4), and (5), respectively) to be output to the eight bit register 25 and multiplexers 19 and 21 select the third input (bits (6) and (7), respectively) to be the output to the eight bit register 25.

Moreover, the logic control circuit produces a load signal which instructs the eight bit register to load itself with the values at the register's input terminals. This load signal is derived from the word length information and the sync signal received from the logic control circuit. The logic control circuit 23 also produces a set signal and a reset signal based upon the word length information and the logic state of the least significant bit of the input bus 5. For example, if the word length of the received pixel byte is one bit and the state of the least significant bit on the input bus 5 is logic 0, the logic control circuit 23 produces a reset signal so that the eight bit register 25 resets the register so logic 00000000 is output. On the other hand, if the word length information indicates that the received pixel byte is one bit and the state of the least significant bit of the input bus 5 is a logic 1, the logic control circuit 23 produces a set signal which causes the eight bit register 25 to set the register, thus outputting logic 11111111.

Figure 5:
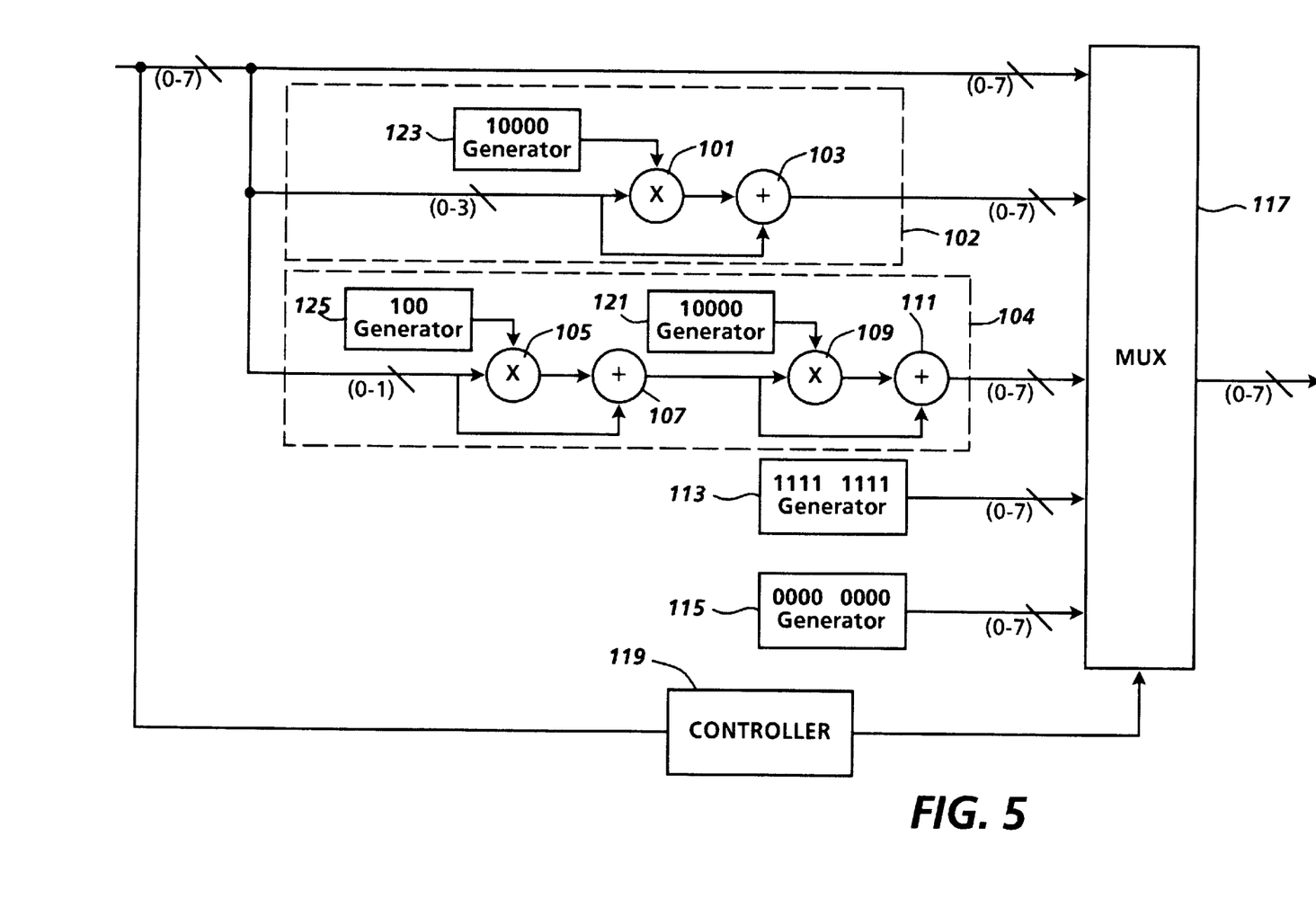
FIG. 5 shows a block diagram illustrating another embodiment of the present invention.

FIG. 5 illustrates a circuit that utilizes the multiplication/addition process discussed above with respect to FIG. 3. More specifically, FIG. 5 illustrates an input bus 5 having a bit width of eight bits (0–7). A controller 119 is connected to the input bus 5 to determine the bit resolution of the received pixel byte and the image data value if the resolution of the pixel byte is only a single bit. The controller 119 uses this information to control the selection process of multiplexer 117.

Multiplexer 117 selects between inputs from 00h generator 115, FFh generator 113, two bit converter 104, four bit converter 102, or the image data value on input bus 5. Multiplexer 117 selects the input from the 00h generator 115 when the controller determines that the bit resolution of the received pixel byte is one bit and the image data value of the pixel byte is a logic zero. Multiplexer 117 selects the input from the FFh generator 113 when the controller determines that the bit resolution of the received pixel byte is one bit and the image data value of the pixel byte is a logic one. Multiplexer 117 selects the input from the two bit converter 104 when the controller determines that the bit resolution of the received pixel byte is two bits. Multiplexer 117 selects the input from the four bit converter 102 when the controller determines that the bit resolution of the received pixel byte is four bits. Lastly, multiplexer 117 selects the input from the input bus 5 when the controller determines that the bit resolution of the received pixel byte is eight bits.

As illustrated in FIG. 5, 00h generator 115 generates an eight bit pixel byte having an image data value of 00h, whereas FFh generator 113 generates an eight bit pixel byte having an image data value of FFh.

With respect to the two bit converter 104, this converter includes two multipliers 105 and 109 and two adders 107 and 111. Two bit converter 104 receives a byte consisting of the bits (0) and (1) from the input bus 5. The byte is multiplied with 4 (binary 100) generated by 100 generator 125 by multiplier 105 to produce a four bit byte. The product of multiplier 105 is added to the byte consisting of the two bits (0) and (1) by adder 107. The four bit byte produced by adder 107 is multiplied with 16 (binary 10000) generated by 10000 generator 121 by multiplier 109 to produce an eight bit byte. The eight bit product of multiplier 109 is added by adder 111 to the four bit byte produced by adder 107 and is transmitted to multiplexer 117. The pixel byte sent to multiplexer 117 is a new pixel byte consisting of a compilation of the received pixel byte, the received pixel byte being a unit in the new pixel byte, which has been repeated four times in the compilation to form an eight bit pixel byte.

With respect to the four bit converter 102, this converter includes a multiplier 101 and an adder 103. Four bit converter 102 receives a byte consisting of the bits (0), (1), (2), and (3) from the input bus 5. The byte is multiplied with 16 (binary 10000) generated by 10000 generator 123 by multiplier 101 to produce an eight bit byte. The eight bit product of multiplier 101 is added to the byte consisting of the bits (0), (1), (2), and (3) by adder 103 and is transmitted to multiplexer 117. The pixel byte sent to multiplexer 117 is a new pixel byte consisting of a compilation of the received pixel byte, the received pixel byte being a unit in the new pixel byte, which has been repeated two times in the compilation to form an eight bit pixel byte.

Figure 1:
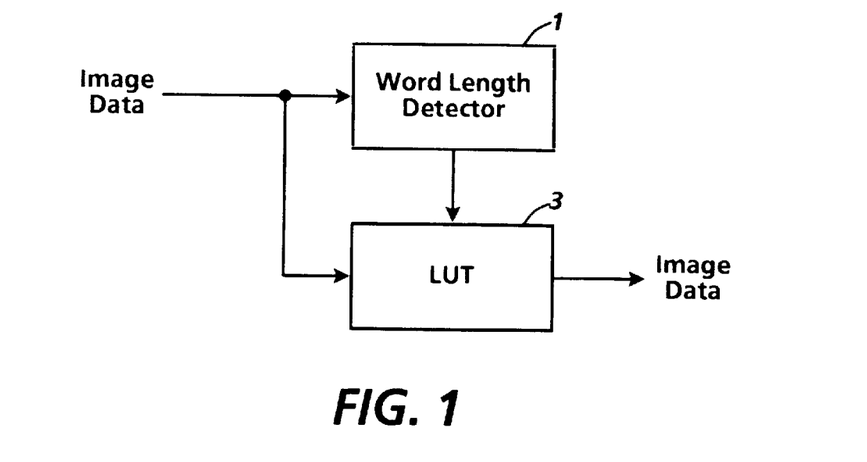
FIG. 1 shows a block diagram illustrating one embodiment of the present invention.
Figure 2:
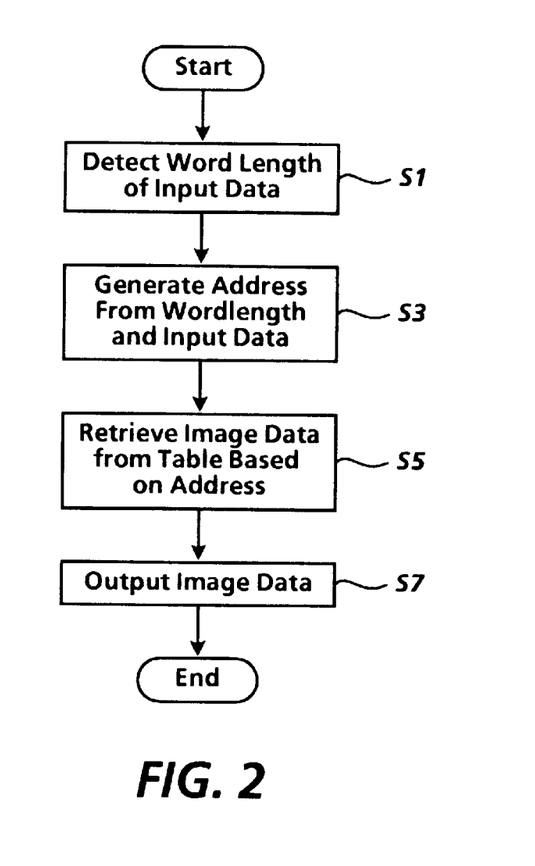
FIG. 2 shows a flowchart illustrating the process of FIG. 1.

FIGS. 1 and 2 illustrate another embodiment of the present invention which converts the received pixel byte using the concepts of the present invention. As illustrated in FIG. 1, image data is received by a word length detector circuit 1 and a look-up table 3. The look-up table 3 has above Tables 1 and 3 stored in a memory which contents are recalled based on an address generated from the information concerning the word length of the received pixel byte and the actual image data value of the received pixel byte. Thus, as illustrated in FIG. 2, the word length of the received pixel byte is detected at step S1 and an address is generated by word length detector circuit 1 according to the word length information of the received pixel byte and the actual image data value of the pixel byte at step S3. Subsequently, image data from the look-up table 3, based upon the generated address at step S5, is generated as an output to be processed by the receiving system at step S7. This image data is a new pixel byte consisting of a compilation of the received pixel byte, the received pixel byte being a unit of the new pixel byte, repeated at least two times in the compilation.

In this embodiment, if the bit resolution of the received pixel byte is 1 and the image data value of the received pixel byte is a logic one, the address generated from this information would be 1111. Moreover, if the bit resolution of the received pixel byte is 1 and the image data value of the received pixel byte is a logic zero, the address generated from this information would be 0000. On the other hand, if the bit resolution of the received pixel byte is two bits and the image data value of the received pixel byte is 10, the generated address would be 1010. Moreover, if the bit resolution of the received pixel byte is two bits and the image data value of the received pixel byte is 01, the generated address would be 0101. Lastly, if the word length of the received pixel byte is four bits, the address for the look-up table would be the image data value of the received pixel byte.

Although the present invention has been described in detail above, various modifications can be implemented without departing from the spirit of the present invention. For example, the preferred embodiment of the present invention has been described with respect to converting a low bit resolution pixel byte to an eight bit byte; however, this conversion method is readily applicable to a system requiring a sixteen bit resolution. This is accomplished by the addition of more multipliers and adders.

Moreover, the present invention has been described utilizing various circuits; however, the concepts of the present invention are not limited to these specific circuits. For example, the concept of forming a new pixel byte as a compilation of a unit pixel byte (the received pixel byte) being repeated at least twice in the compilation can be realized by simply loading and shifting a shift register. More specifically, the least significant bits of a register are initially loaded with the unit pixel byte and the unit pixel byte is then shifted to more significant bits of the register such the unit pixel byte no longer resides in the initially loaded least significant bits. This process is repeated until the register is filled with a repeating pattern of the unit pixel byte.

Lastly, the present invention has been described with respect to a facsimile transmission environment. However, the concepts of the present invention are readily applicable to any environment wherein image data is transferred or transmitted between systems requiring bit resolutions different than the bit resolution residing on the communication channel. Namely, the grey value expansion process of the present invention can be applied in a networked environment wherein the image data is generated by one network client and the image data is processed by a conventional image processor and/or reproduced by a conventional printing system at another network client.

In recapitulation, the present invention provides a grey value expansion method or system which enables a receiving system to convert image data having a lower bit resolution to the native bit resolution of the receiving system. This conversion produces a new pixel byte which is a compilation of the received pixel byte wherein the received pixel byte has been repeated at least two times in the compilation. More specifically, the present invention converts a pixel byte having a bit resolution equal to A to a new pixel byte having a bit resolution equal to B wherein the new pixel byte is a compilation of the received pixel byte, the received pixel byte being a unit of the new pixel byte, such that the received pixel byte has been repeated N times in the compilation, N being an integer equal to or greater than two and N times A being less than or equal to B.

While the present invention has been described with reference to various embodiments disclosed herein before, it is not to be combined to the detail set forth above, but is intended to cover such modifications or changes as made within the scope of the attached claims.

What is claimed is:

1. A circuit for expanding a byte of pixel image data having a bit resolution of at least two bits, comprising:

detecting means for detecting a bit resolution of the byte of pixel image data, the bit resolution of the byte of pixel image data being equal to an integer N; and new pixel generating means for generating a new pixel image data byte having a predetermined bit resolution, the predetermined bit resolution being equal to an integer M, in response to said detecting means detecting that the bit resolution of the byte of pixel image data is less than the predetermined bit resolution, the new pixel image data byte being a compilation of the byte of pixel image data repeated M/N times in the compilation, M/N being an integer.

2. A method for expanding a byte of pixel image data having a bit resolution of at least two bits, comprising:

(a) detecting a bit resolution of the byte of pixel image data, the bit resolution of the byte of pixel image data being equal to an integer N; and (b) generating a new pixel image data byte having a predetermined bit resolution, the predetermined bit resolution being equal to an integer M, when the bit resolution of the byte of pixel image data is less than the predetermined bit resolution, the new pixel image data byte being a compilation of the byte of pixel image data repeated M/N times in the compilation, M/N being an integer.

3. A system for processing received image data having a bit resolution of at least two bits, the bit resolution being lower than a native bit resolution, comprising:

means for separating the received image data into a plurality of bytes of pixel image data;

detecting means for detecting a bit resolution of a byte of pixel image data, the bit resolution of the byte of pixel image data being equal to an integer N;

new pixel generating means for generating a new pixel image data byte having a predetermined bit resolution, the predetermined bit resolution being equal to an integer M, in response to said detecting means detecting that the bit resolution of the byte of pixel image data is less than the predetermined bit resolution, the new pixel image data byte being a compilation of the byte of pixel image data repeated M/N times in the compilation, M/N being an integer;

image processing means for image processing the new pixel image data byte.

4. The circuit as claimed in claim 1, wherein the bit resolution of the byte of the pixel image data is four bits, the predetermined bit resolution is eight bits, and the new pixel image data byte is a compilation of the four bit byte of pixel image data repeated two times in the compilation.

5. The circuit as claimed in claim 1, wherein the bit resolution of the byte of the pixel image data is two bits, the predetermined bit resolution is eight bits, and the new pixel image data byte is a compilation of the two bit byte of pixel image data repeated four times in the compilation.

6. The circuit as claimed in claim 1, wherein the predetermined bit resolution M is sixteen bits, and the new pixel image data byte is a compilation of the N-bit byte of pixel image data repeated 16/N times in the compilation, 16/N being an integer.

7. The circuit as claimed in claim 1, wherein said new pixel generating means comprises:

multiplier means for multiplying the byte of pixel image data with a value to produce a product, the product being a compilation having a bit resolution that is twice the bit resolution of the byte of pixel image data, the compilation having a most significant bit part having a number of bits equal to the bit resolution of the byte of pixel image data and a least significant bit part having a number of bits equal to the bit resolution of the byte of pixel image data, the most significant bit part of the compilation being the byte of pixel image data and the least significant bit part of the compilation being a byte of logic zeros; and adder means for adding the byte of pixel image data to the product produced by said multiplier means to produce a byte of data being a compilation of the byte of pixel image data repeated twice in the compilation.

8. The method as claimed in claim 2, wherein the bit resolution of the byte of the pixel image data is four bits, the predetermined bit resolution is eight bits, and the new pixel image data byte is a compilation of the four bit byte of pixel image data repeated two times in the compilation.

9. The method as claimed in claim 2, wherein the bit resolution of the byte of the pixel image data is two bits, the predetermined bit resolution is eight bits, and the new pixel image data byte is a compilation of the two bit byte of pixel image data repeated four times in the compilation.

10. The method as claimed in claim 2, wherein the predetermined bit resolution is sixteen bits, and the new pixel image data byte is a compilation of the byte of pixel image data repeated 16/N times in the compilation, 16/N being an integer.

11. The system as claimed in claim 3, further comprising:
    printing means for converting the new pixel image data byte processed by said image processing means to an image on a document.

12. The system as claimed in claim 11, wherein the bit resolution of the byte of the pixel image data is four bits, the predetermined bit resolution is eight bits, and the new pixel image data byte is a compilation of the four bit byte of pixel image data repeated two times in the compilation.

13. The system as claimed in claim 11, wherein the bit resolution of the byte of the pixel image data is two bits, the predetermined bit resolution is eight bits, and the new pixel image data byte is a compilation of the two bit byte of pixel image data repeated four times in the compilation.

14. The system as claimed in claim 11, wherein said new pixel generating means comprises:

multiplier means for multiplying the byte of pixel image data to produce a product, the product being a compilation having a bit resolution that is twice the bit resolution of the byte of pixel image data, the compilation having a most significant bit part having a number of bits equal to the bit resolution of the byte of pixel image data and a least significant bit part having a number of bits equal to the bit resolution of the byte of pixel image data, the most significant bit part of the compilation being the byte of pixel image data and the least significant bit part of the compilation being a byte of logic zeros; and adder means for adding the byte of pixel image data to the product produced by said multiplier means to produce a byte of data being a compilation of the byte of pixel image data repeated twice in the compilation.

\* \* \* \* \*